(12) United States Patent
Ishiwata et al.

(10) Patent No.: US 12,251,864 B2
(45) Date of Patent: Mar. 18, 2025

(54) MOLD DEVICE AND INJECTION MOLDING METHOD

(71) Applicant: KOITO MANUFACTURING CO., LTD., Tokyo (JP)

(72) Inventors: Tsukasa Ishiwata, Shizuoka (JP); Noriyuki Nakajima, Shizuoka (JP); Jyunya Sano, Shizuoka (JP); Hiroya Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 107 days.

(21) Appl. No.: 18/267,893

(22) PCT Filed: Dec. 10, 2021

(86) PCT No.: PCT/JP2021/045625
§ 371 (c)(1),
(2) Date: Jun. 16, 2023

(87) PCT Pub. No.: WO2022/131165
PCT Pub. Date: Jun. 23, 2022

(65) Prior Publication Data
US 2024/0066774 A1     Feb. 29, 2024

(30) Foreign Application Priority Data

Dec. 18, 2020    (JP) ................................ 2020-210763

(51) Int. Cl.
*B29C 45/16*      (2006.01)
*B29C 45/26*      (2006.01)
(Continued)

(52) U.S. Cl.
CPC .......... *B29C 45/32* (2013.01); *B29C 45/1675* (2013.01); *B29C 45/2602* (2013.01); *B29C 45/33* (2013.01)

(58) Field of Classification Search
CPC . B29C 45/16; B29C 45/1628; B29C 45/1675; B29C 45/2602; B29C 45/32; B29C 45/33
See application file for complete search history.

(56) References Cited

U.S. PATENT DOCUMENTS

2018/0250859 A1*   9/2018   Ito ....................... B29C 45/0025
2021/0024139 A1*   1/2021   Tsutsumi ............ B29C 45/1628

FOREIGN PATENT DOCUMENTS

JP      2014168936 A     9/2014
WO    2018016323 A1    1/2018

* cited by examiner

*Primary Examiner* — Thu Khanh T. Nguyen
(74) *Attorney, Agent, or Firm* — Osha Bergman Watanabe & Burton LLP

(57) ABSTRACT

A mold device includes a primary mold and a secondary mold. The primary mold includes a cavity mold and a primary core mold. The primary mold is configured to inject a first resin material into a first cavity to mold a primary molded product, the first cavity being formed by clamping the cavity mold and the primary core mold. The secondary mold includes the cavity mold and a secondary core mold. The secondary mold is configured to inject a second resin material into a second cavity to stack mold a secondary molded product on a peripheral edge of the primary molded product. The second cavity is formed by clamping the cavity mold and the secondary core mold. The cavity mold is configured to hold the primary molded product. The cavity mold includes a primary molded product holding portion configured to project into and retract from the first cavity, on a parting line of the primary mold. The secondary core mold includes a slide portion configured to project into and retract from the second cavity on a parting line of the secondary mold. The slide portion having a shape that complements the primary molded product holding portion. At the time of mold opening in primary molding, the primary molded (Continued)

product holding portion protrudes into the first cavity locks an end surface of the primary molded product to hold the primary molded product in the cavity mold. At the time of mold clamping in secondary molding, the primary molded product holding portion retracts from the second cavity and the slide portion slides relative to the primary molded product holding portion to protrude into the second cavity, to define the second cavity.

5 Claims, 16 Drawing Sheets

(51) Int. Cl.
*B29C 45/32* (2006.01)
*B29C 45/33* (2006.01)

MOLD DEVICE AND INJECTION MOLDING METHOD

TECHNICAL FIELD

The present disclosure relates to a mold device and an injection molding method.

BACKGROUND ART

In the related art, as one method of injection molding, a method of injection molding a two-color molded product in which a secondary molded product made of a second resin is arranged around a primary molded product made of a first resin, is known.

Patent Literatures 1 and 2 disclose a technique of injection molding a two-color molded product using a rotation member rotatably arranged around an axis passing between a primary core mold and a secondary core mold, and a cavity mold fixed to the rotation member to be openable and closable with the primary core mold and the secondary core mold.

In general, a molded product is held in a core mold at the time of mold opening. Meanwhile, in two-color molding according to the technique described above, it is necessary to hold the primary molded product in the cavity mold after primary molding. Therefore, in Patent Literature 1, a primary molded product holding portion that projects into and retracts from a primary formation space is provided in the cavity mold, and the primary molded product holding portion protrudes into the primary molding space at the time of primary molding, whereby the primary molded product is held in the cavity mold at the time of mold opening in the primary molding. In Patent Literature 2, a biasing member that biases the primary molded product toward the cavity mold is provided in the primary core mold, and the primary molded product is held in the cavity mold at the time of mold opening after the primary molding. In the present description, the term "protrude into the molding space" means not only protruding into the molding space but also coming into contact with a boundary of the molding space to define a part of the molding space.

CITATION LIST

Patent Literature

Patent Literature 1: JP2014-168936A
Patent Literature 2: WO2018/016323

SUMMARY OF INVENTION

Technical Problem

However, in Patent Literature 1, there is a problem that traces of a locking portion of a projection and retraction member remain on a surface of a finished product, resulting in an unattractive appearance. In Patent Literature 2, it may be necessary to provide a rib on an outer edge of the primary molded product to bias, and the appearance is poor due to the rib. The rib may interfere with a slide portion for an undercut, and the undercut cannot be provided in the portion. For this reason, there is a problem that restrictions on design are generated and it is not possible to meet diversified design requirements.

An object of the present disclosure is to provide a new technique for holding a primary molded product in a cavity mold in two-color molding.

Solution to Problem

A mold device including: a primary mold including a cavity mold and a primary core mold, the primary mold being configured to inject a first resin material into a first cavity to mold a primary molded product, the first cavity being formed by clamping the cavity mold and the primary core mold; and a secondary mold including the cavity mold and a secondary core mold, the secondary mold being configured to inject a second resin material into a second cavity to stack mold a secondary molded product on a peripheral edge of the primary molded product, the second cavity being formed by clamping the cavity mold and the secondary core mold, the cavity mold being configured to hold the primary molded product, wherein the cavity mold includes a primary molded product holding portion configured to project into and retract from the first cavity, on a parting line of the primary mold, the secondary core mold includes a slide portion configured to project into and retract from the second cavity, on a parting line of the secondary mold, the slide portion having a shape that complements the primary molded product holding portion, at the time of mold opening in primary molding, the primary molded product holding portion protruding into the first cavity locks an end surface of the primary molded product to hold the primary molded product in the cavity mold, and at the time of mold clamping in secondary molding, the primary molded product holding portion retracts from the second cavity and the slide portion slides relative to the primary molded product holding portion to protrude into the second cavity, to define the second cavity.

An injection molding method of a two-color molded product in which a secondary molded product is stack molded on a peripheral edge of a primary molded product, the injection molding method including: a step of clamping a cavity mold and a primary core mold to define a first cavity, in which a primary molded product holding portion protrudes, the primary molded product holding portion being provided in the cavity mold, the primary molded product holding portion being configured to project into and retract from the first cavity on a parting line; a step of injecting a first resin material into the first cavity to mold the primary molded product; a step of opening the primary mold while the primary molded product holding portion locks an end portion of a peripheral edge of the primary molded product to hold the primary molded product in the cavity mold; a step of clamping a secondary core mold and the cavity mold to define a second cavity, in which the primary molded product holding portion retracts from the second cavity and the slide portion slides relative to the primary molded product holding portion to protrude into the second cavity to define the second cavity, the cavity mold holding the primary molded product, the primary molded product holding portion being configured to project into and retract from the second cavity on a parting line of a secondary mold, a slide portion having a shape that complements the primary molded product holding portion; and a step of injecting a second resin material into a portion, of the second cavity, excluding the primary molded product to form the secondary molded product.

Advantageous Effects of Invention

According to the mold device and the injection molding method according to the above aspects, in the two-color molding, the primary molded product can be held in the cavity mold after the primary molding.

DESCRIPTION OF EMBODIMENTS

Figure 1:
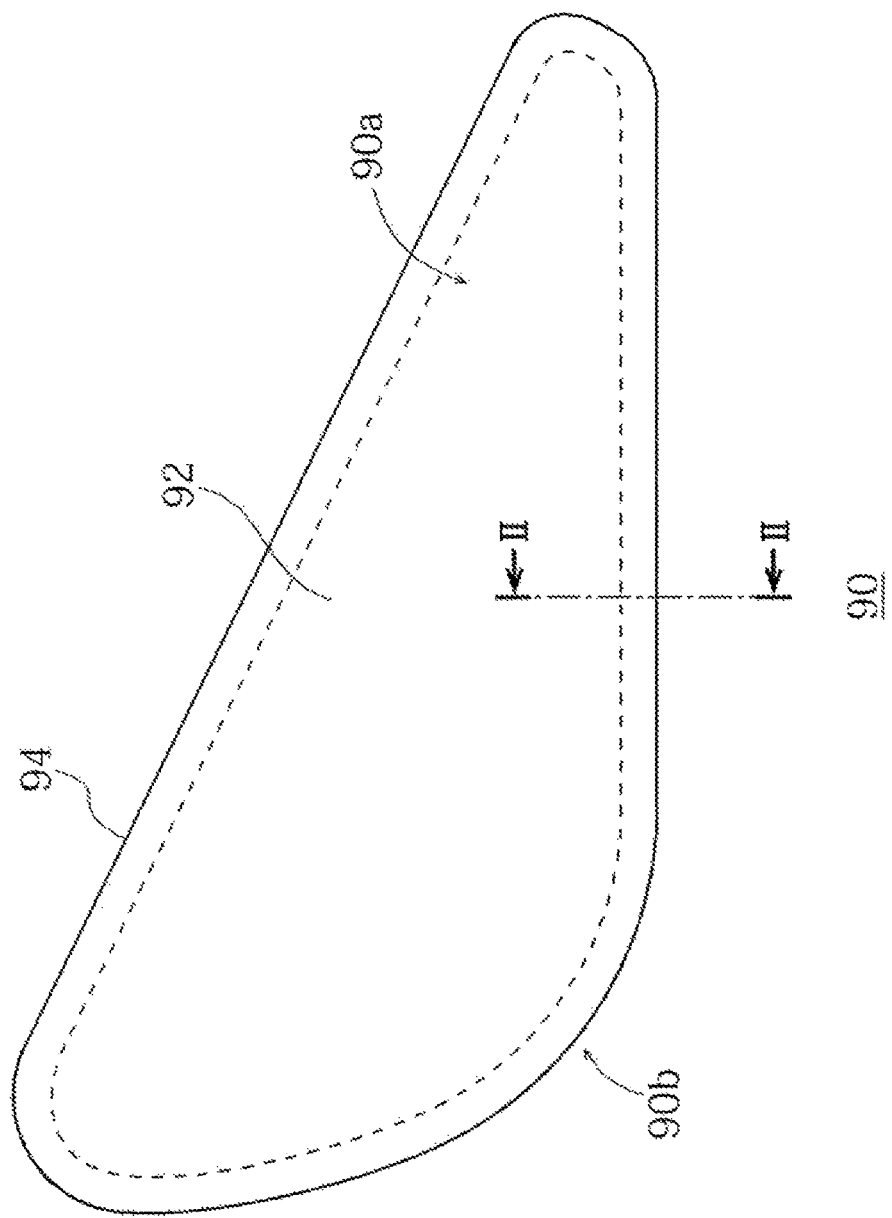
FIG. 1 is a front view of a two-color molded product molded using an injection molding method according to the present embodiment.

Hereinafter, the embodiments of the present disclosure will be described with reference to the drawings. In the description of the drawings, the same components are denoted by the same reference numerals, the same components are denoted by the same names, and components that are not particularly referred to are the same, and redundant descriptions will be appropriately omitted. In addition, in each drawing, a dimensional ratio of each member does not necessarily coincide with an actual dimensional ratio.
(Two-Color Molded Product)

Figure 2:
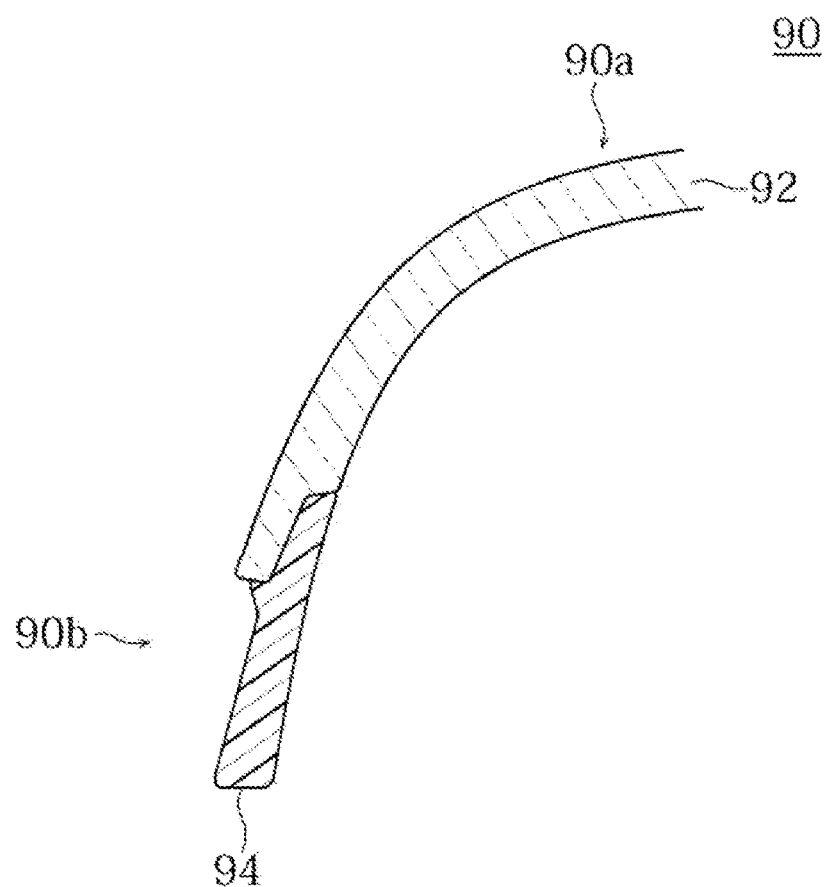
FIG. 2 is a cross-sectional view of the two-color molded product taken along line II-II in FIG. 1.

First, a configuration of a two-color molded product 90 molded using a mold device 100 and an injection molding method according to the present embodiment will be described. FIG. 1 is a front view of the two-color molded product 90. FIG. 2 is a cross-sectional view of a part taken along line II-II in FIG. 1.

The two-color molded product 90 is a front cover that is assembled to a front opening of a lamp body of a vehicle lamp such as a headlamp. The two-color molded product 90 includes a front surface portion 90a and a peripheral surface portion 90b extending rearward from an outer peripheral edge of the front surface portion 90a.

In the two-color molded product 90, a secondary molded product 94 is arranged around a primary molded product 92. The primary molded product 92 is made of a first resin material R1 (transparent resin). The secondary molded product 94 is made of a second resin material R2 (opaque, specifically black, resin). The two-color molded product 90 is formed such that the primary molded product 92 and the secondary molded product 94 are partially overlapped on the peripheral surface portion 90b.
(Mold Device)

Figure 3:
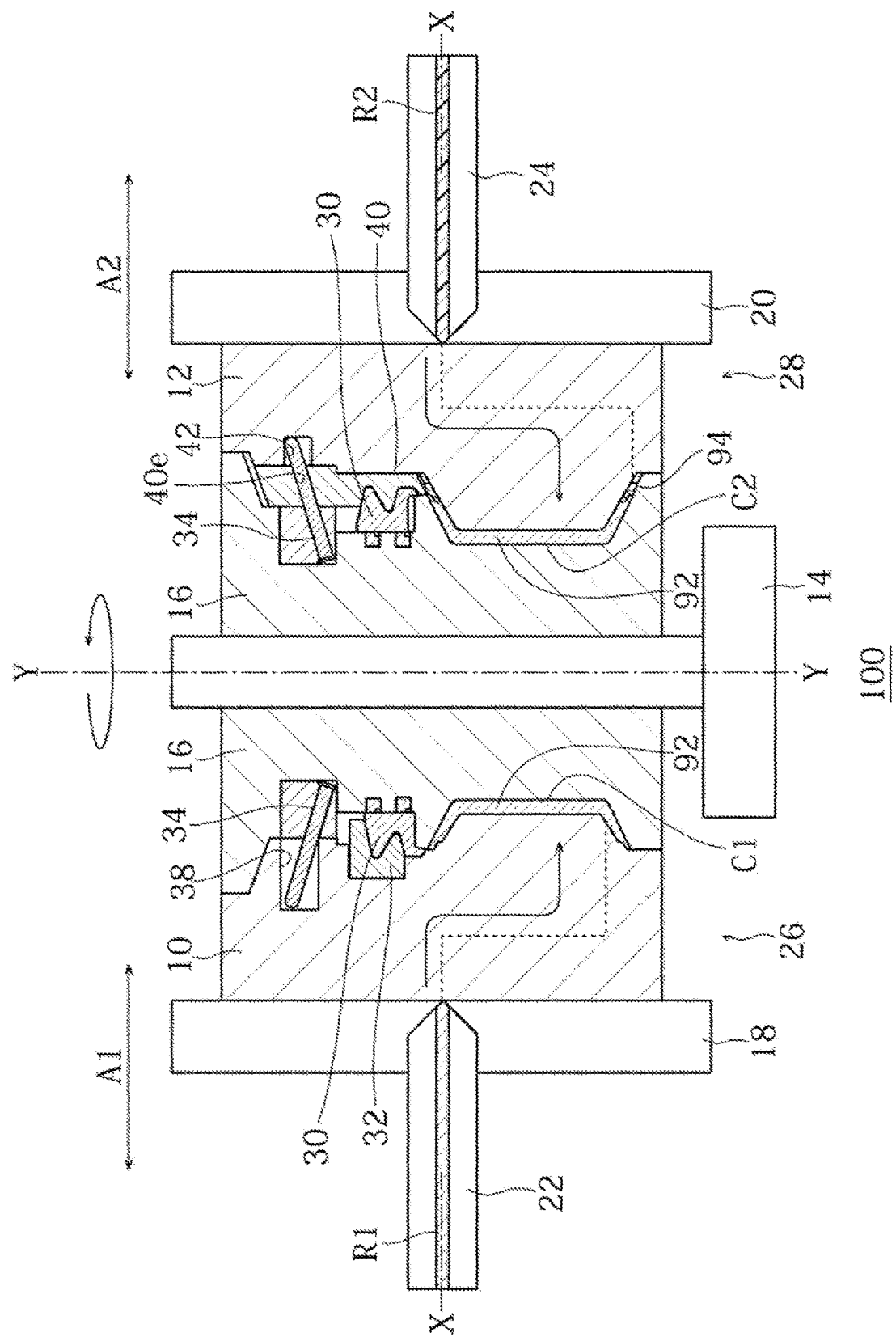
FIG. 3 is a schematic cross-sectional view of a mold device used in the injection molding method according to the present embodiment.

FIG. 3 is a cross-sectional view schematically showing the mold device 100 used in the injection molding method according to the present embodiment. The mold device 100 is configured as a so-called facing-type mold for two-color molding.

The mold device 100 includes a primary core mold 10 and a secondary core mold 12 which are arranged in a state of facing each other on an X axis extending in a horizontal direction, a rotation member 14, which is arranged between the primary core mold 10 and the secondary core mold 12, rotatable around a Y axis that is orthogonal to the X axis and that extends in a vertical direction, a pair of cavity molds 16 having the same shape and fixed to the rotation member 14 in a state of interposing the Y axis between the pair of cavity molds 16, a first movable platen 18 that supports the primary core mold 10, and a second movable platen 20 that supports the secondary core mold 12.

The primary core mold 10 and the secondary core mold 12 are so-called movable molds, and the pair of cavity molds 16 are so-called fixed molds.

The first movable platen 18 is configured to move in an X-axis direction, as indicated by an arrow A1, with respect to the rotation member 14. The second movable platen 20 is also configured to move in the X-axis direction, as indicated by an arrow A2, with respect to the rotation member 14.

The mold device 100 is configured to inject the first resin material R1, which is supplied from a first heating cylinder 22 supported by the first movable platen 18, into a first cavity C1 formed between the primary core mold 10 and the cavity mold 16 which are brought into contact with each other by mold clamping, to mold the primary molded product 92. The mold device 100 is also configured to inject the second resin material R2, which is supplied from a second heating cylinder 24 supported by the second movable platen 20, into a portion of a second cavity C2 excluding the primary molded product 92, to mold the secondary molded product 94. The second cavity C2 is formed between the secondary core mold 12 and the cavity mold 16 which are brought into contact with each other by the mold clamping. Therefore, the primary core mold 10 and one of the cavity molds 16 configures a primary mold 26, and the secondary core mold 12 and the other of the cavity molds 16 configures a secondary mold 28.

The cavity mold 16 includes a cavity keeper 30, as a primary molded product holding portion, on a peripheral edge of the first cavity C1. In addition, the cavity mold 16 includes an angular pin 34 protruding toward the primary core mold 10 or the secondary core mold 12 while being inclined to be separated from the X axis toward the outside of the cavity keeper 30.

On the other hand, the primary core mold 10 includes a cotter 32 having a shape matching the cavity keeper 30, at a position facing the cavity keeper 30. The primary core mold 10 also includes a pin insertion portion 38 functioning as a first pin insertion hole, at a position corresponding to the angular pin 34 in the primary core mold 10.

The secondary core mold 12 includes a slide portion 40 at the position facing the cavity keeper 30. The secondary core mold 12 also includes a pin insertion hole 40e functioning as a second pin insertion hole, at a position corresponding to the angular pin 34 in the secondary core mold 12.

The cavity keeper 30, the cotter 32, the angular pins 34, the pin insertion portion 38, and the pin insertion hole 40e cooperate with one another to hold the primary molded product 92 in the cavity mold 16 at the time of mold opening of the primary mold 26 and to hold the two-color molded product 90 in the secondary core mold 12 at the time of mold opening of the secondary mold 28. That is, the cavity keeper 30, the cotter 32, the angular pin 34, the pin insertion portion 38, and the pin insertion hole 40e function as a molded product holding mechanism. One or more molded product holding mechanisms are provided on peripheral edges of the primary mold 26 and the secondary mold 28, as necessary. Detailed actions of the molded product holding mechanism will be described later. In the description of the molded product holding mechanism, unless otherwise specified, a direction toward a molding space (first cavity C1) along the Y axis is referred to as a front direction, and a direction toward the outside of the mold device 100 along the Y axis is referred to as a rear direction.

(Outline of Injection Molding Method)

Figure 4A:
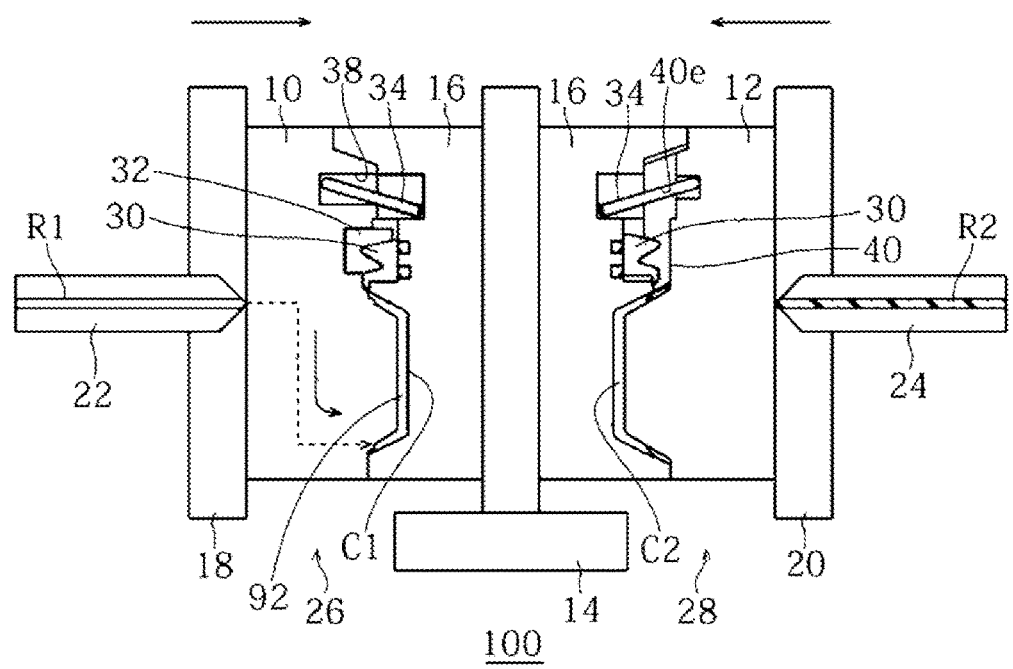
FIG. 4A is a schematic cross-sectional view of the mold device at the time of mold clamping in primary molding in the injection molding method according to the present embodiment.

Here, an outline of the injection molding method according to the present embodiment will be described. First, as shown in FIG. 4A, by moving the first movable platen 18 and the second movable platen 20 toward the rotation member 14, the primary core mold 10 and one of the cavity molds 16 are clamped, and the secondary core mold 12 and the other of the cavity molds 16 are clamped. In this way, the primary core mold 10 and the cavity mold 16 are brought into contact with each other, and the first cavity C1 is formed therebetween. At this time, the cavity keeper 30 protrudes slightly into the first cavity C1, and a tip of the cavity keeper 30 forms a part of the first cavity C1. Then, the first resin material R1 is injected into the first cavity C1 from the first heating cylinder 22 supported by the first movable platen 18, whereby the primary molded product 92 is molded.

Figure 4B:
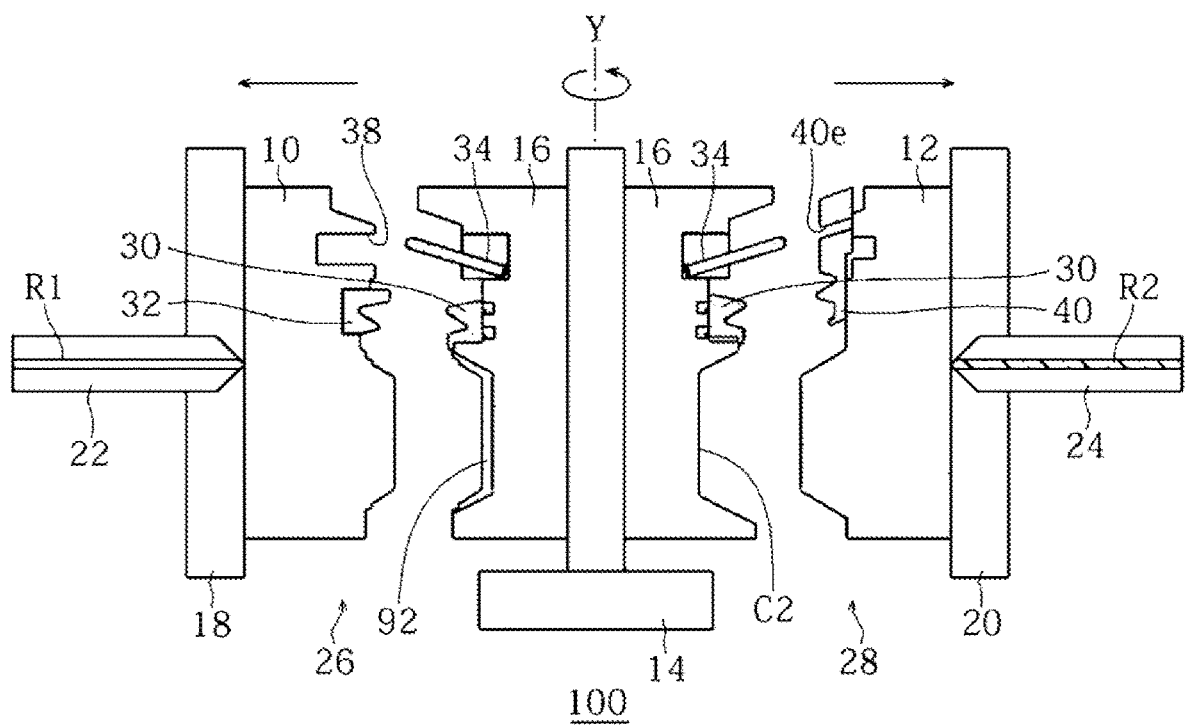
FIG. 4B is a schematic cross-sectional view of the mold device at the time of mold opening in the primary molding in the injection molding method according to the present embodiment.

Next, as shown in FIG. 4B, the primary core mold 10 and one of the cavity molds 16 are opened, and the secondary core mold 12 and the other of the cavity molds 16 are opened. At this time, the primary molded product 92 is tend to be attached to the primary core mold 10 by a contraction action of the first resin material R1. However, the cavity keeper 30 provided in the cavity mold 16 is engaged with an end surface of a peripheral edge of the primary molded product 92 to prevent the primary molded product 92 from separating from the cavity mold 16. As a result, the primary molded product 92 detaches from the primary core mold 10 while being held by the cavity mold 16.

Next, in this state, the rotation member 14 is rotated by 180° around the Y axis. At this time, although a centrifugal force acts on the primary molded product 92 held by the cavity mold 16 rotating together with the rotation member 14, the primary molded product 92 remains held by the cavity mold 16 because the primary molded product 92 is locked by the cavity keeper 30. As described above, the cavity mold 16 according to the present embodiment functions as a holding mold that holds the primary molded product 92, at the time of mold opening.

Figure 5A:
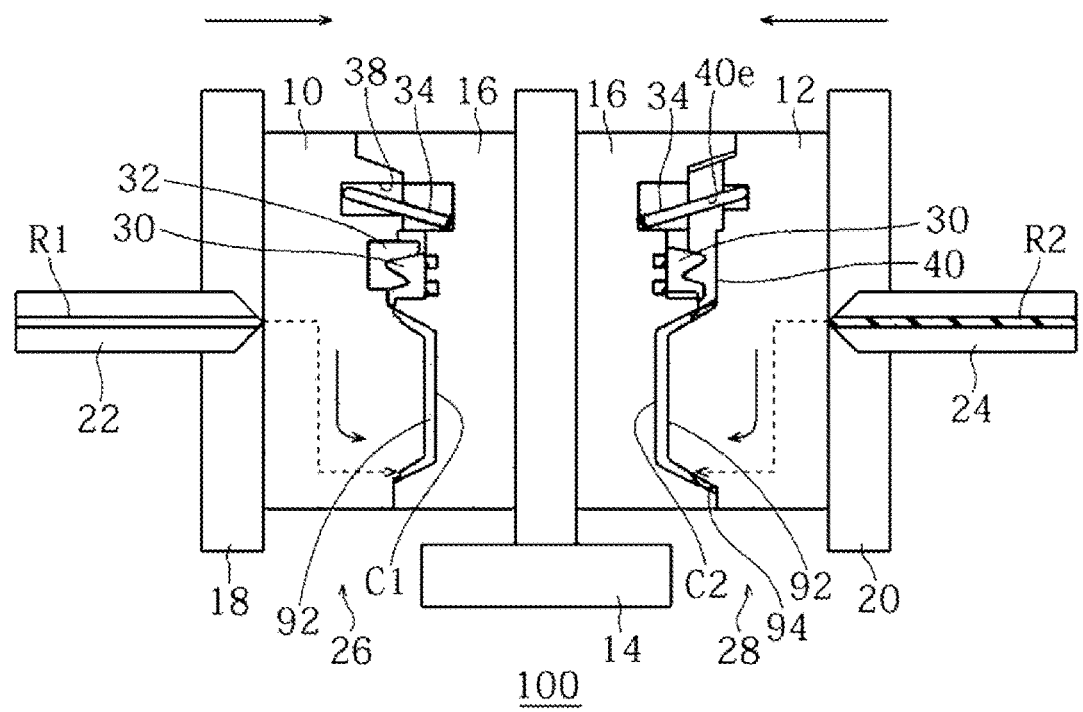
FIG. 5A is a schematic cross-sectional view of the mold device at the time of mold clamping in secondary molding in the injection molding method according to the present embodiment.

Next, as shown in FIG. 5A, by moving the first movable platen 18 and the second movable platen 20 toward the rotation member 14, the primary core mold 10 and one of the cavity molds 16 are clamped, and the secondary core mold 12 and the other of the cavity molds 16 are clamped. As a result, on a secondary mold 28 side, the secondary core mold 12 and the cavity mold 16 holding the primary molded product 92 are brought into contact with each other, and the second cavity C2 is formed. At this time, the cavity keeper 30 moves backward from the second cavity C2, the slide portion 40 moves forward toward a second cavity C2 side, and a tip of the slide portion 40 forms a part of the second cavity C2. In this state, by injecting the second resin material R2, supplied from the second heating cylinder 24, into a portion of the second cavity C2 excluding the primary molded product 92, the secondary molded product 94 is molded. Thus, the two-color molded product 90 in which the primary molded product 92 and the secondary molded product 94 are integrated together, is manufactured.

At this time, on a primary mold 26 side, the primary molded product 92 is molded as in FIG. 4A.

Figure 5B:
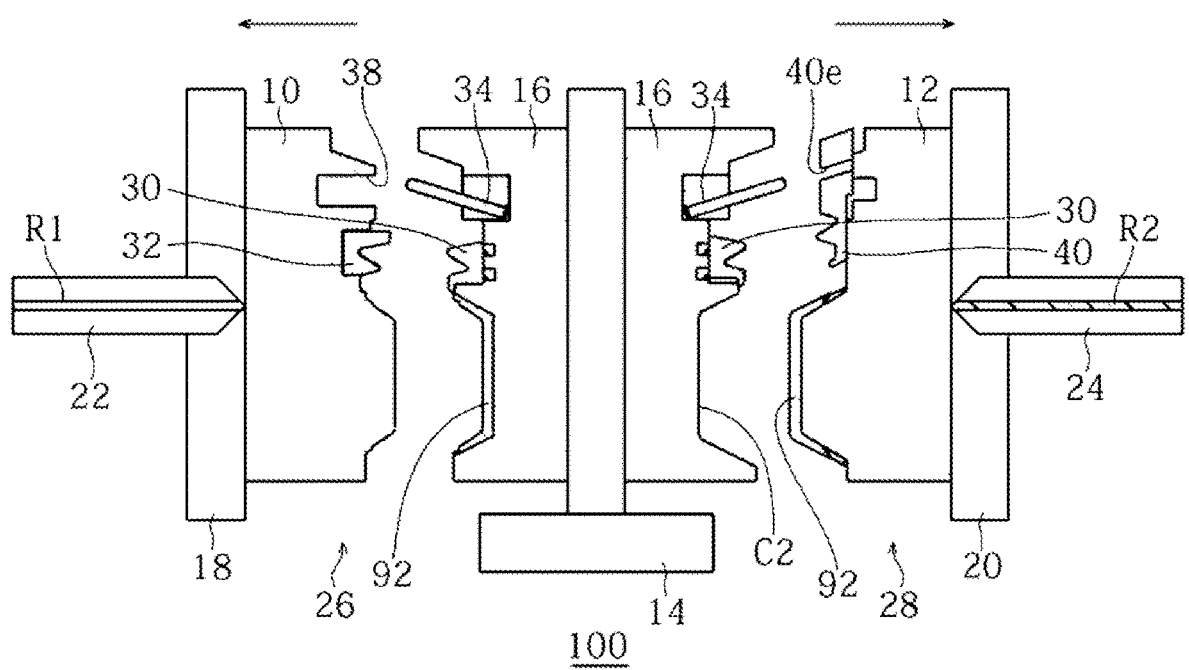
FIG. 5B is a schematic cross-sectional view of the mold device at the time of mold opening in the secondary molding in the injection molding method according to the present embodiment.

Next, as shown in FIG. 5B, the primary core mold 10 and one of the cavity molds 16 are opened, and the secondary core mold 12 and the other of the cavity molds 16 are opened. On the secondary mold 28 side, the two-color molded product 90 and the cavity keeper 30 do not engage with each other, and thus the two-color molded product 90 is attached to the secondary core mold 12 at the time of mold opening. Then, the two-color molded product 90 attached to the secondary core mold 12 is pushed out by a push pin that is not shown, and the two-color molded product 90 is taken out from the secondary mold 28 by being pinched by a taking-out machine that is not shown.

At this time, on the primary mold 26 side, the primary molded product 92 is held in the cavity mold 16 by the cavity keeper 30 as in FIG. 4B.

Next, by rotating the rotation member 14 by 1800 around the Y axis, the mold device 100 returns to the state shown in FIG. 5A. By repeating the above, the two-color molded product 90 is continuously manufactured.

(Molded Product Holding Mechanism)

Next, details of the molded product holding mechanism will be described.

Figure 6:
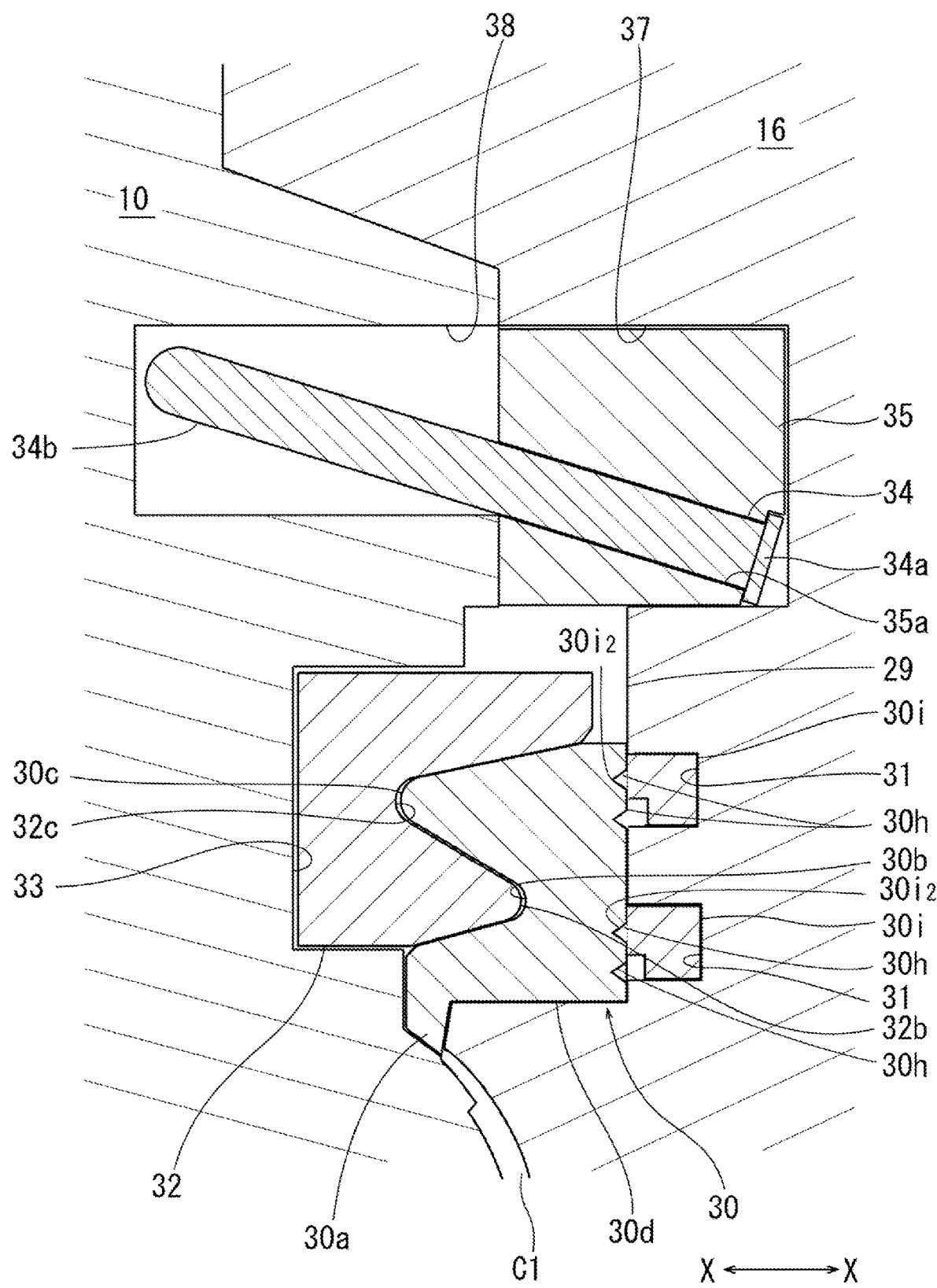
FIG. 6 is an enlarged view of a molded product holding mechanism in a contact state of a primary mold of the mold device.
Figure 7:
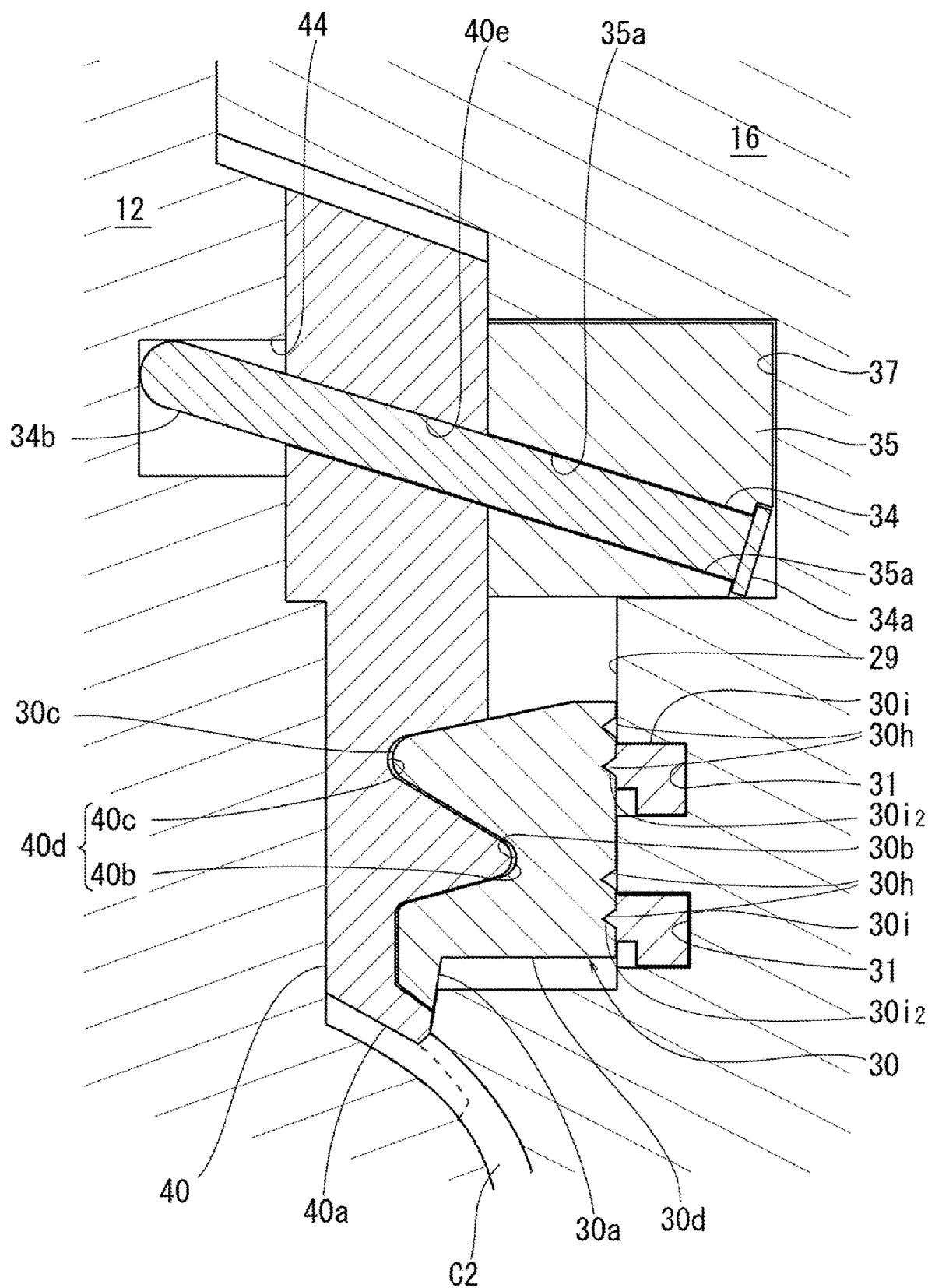
FIG. 7 is an enlarged view of the molded product holding mechanism in a contact state of a secondary mold of the mold device.

FIG. 6 is a cross-sectional view showing the molded product holding mechanism in a state in which the primary core mold 10 and the cavity mold 16 of the primary mold 26 are brought into contact with each other. FIG. 7 is a cross-sectional view showing the molded product holding mechanism in a state in which the secondary core mold 12 and the cavity mold 16 of the secondary mold 28 are brought into contact with each other. For convenience of understanding, in the following drawings, the primary mold 26 and the secondary mold 28 are shown on a left side, and the cavity mold 16 is shown on a right side.

Figure 8A:
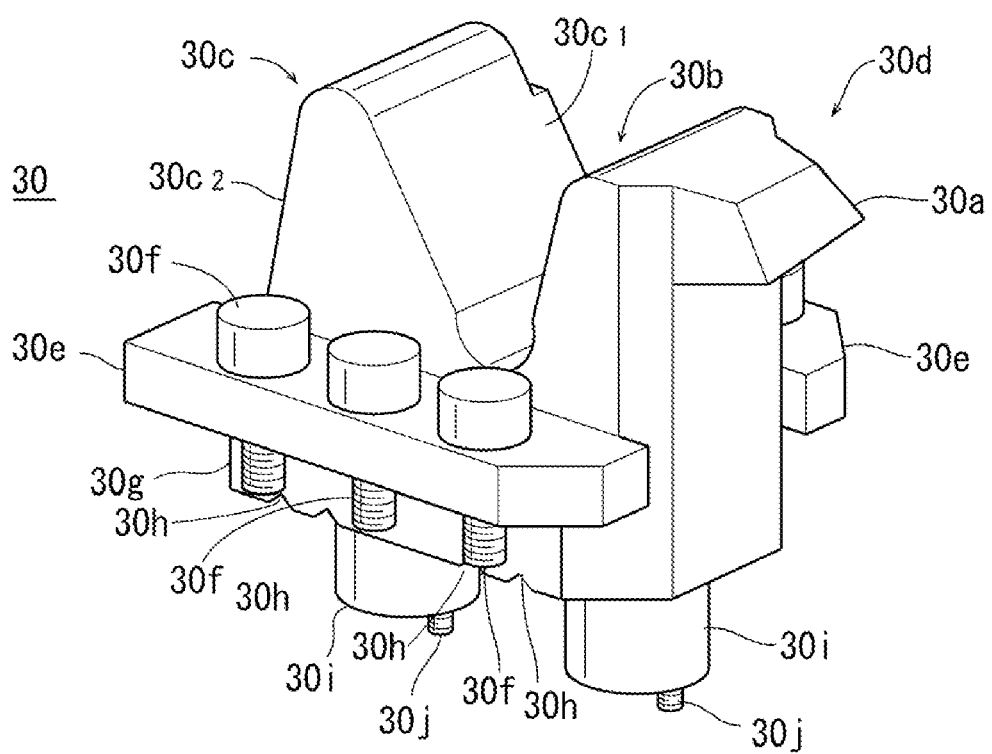
FIG. 8A is an enlarged perspective view of a primary molded product holding portion of the mold device.
Figure 8B:
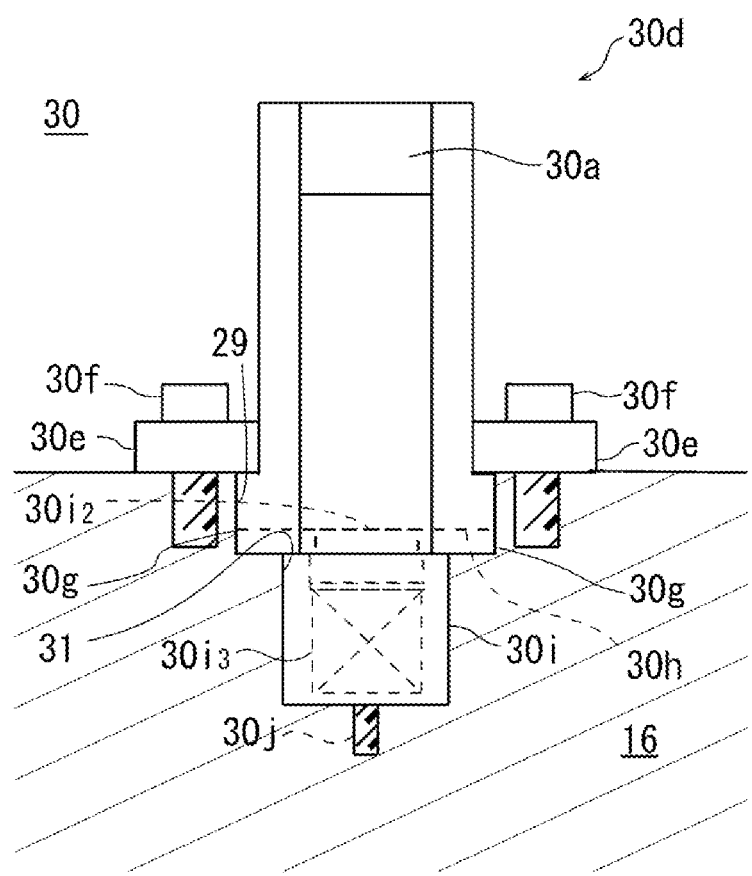
FIG. 8B is a front view of the primary molded product holding portion of the mold device.
Figure 8C:
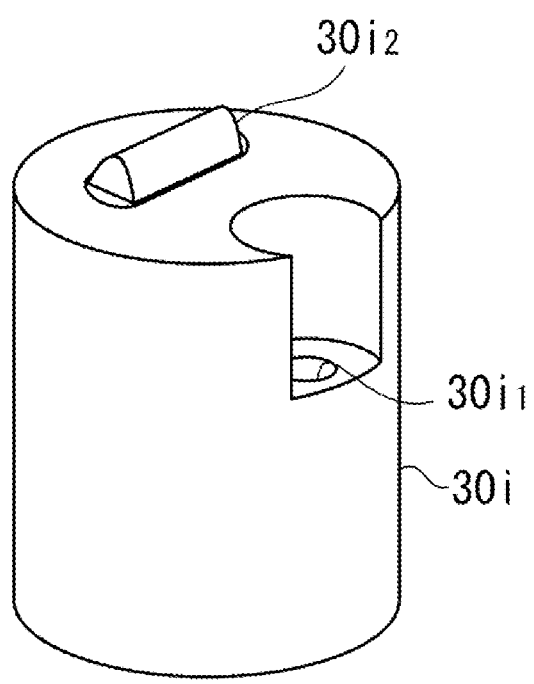
FIG. 8C is an enlarged perspective view of a positioning member of the primary molded product holding portion of the mold device as viewed from the same direction as FIG. 8A.

FIG. 8A is a perspective view of the cavity keeper 30. FIG. 8B is a front view showing a state in which the cavity keeper 30 is incorporated into the cavity mold 16. FIG. 8C is a perspective view of a positioning member 30$i$ of the cavity keeper 30 as viewed from the same direction as FIG. 8A.

As shown in FIGS. 6, 8A, and 8B, the cavity keeper 30 includes a front end portion 30$a$ having a thin beak-shape whose thickness is reduced downward in FIG. 6 (rightward in FIG. 8A), and a cavity keeper body 30$d$, which has a three-dimensional shape, formed by moving cross sections, of a concave portion 30$b$ having a valley-shaped cross section and a convex portion 30$c$ having a mountain-shaped cross section, in a direction orthogonal to the cross sections. An angle of a tip of the front end portion 30$a$ is appropriately set in consideration of a mold strength and is preferably about 45°. The valley-shaped concave portion 30$b$ and the mountain-shaped convex portion 30$c$ form an uneven structure of the cavity keeper 30.

As shown in FIG. 8B, a widened portion 30$g$ widened in a left-right direction of FIG. 8B is formed at a lower end portion of the cavity keeper body 30$d$. Pressing plates 30$e$ are arranged on the left and right sides, in the drawing, of the cavity keeper body 30$d$. The pressing plate 30$e$ extends along an upper end of the widened portion 30$g$, and holds the cavity keeper body 30$d$ to be movable in a front-rear direction in a cavity keeper attachment concave portion 29 of the cavity mold 16. Each pressing plate 30$e$ is provided with three through holes, which are not shown, arranged in series in a depth direction of the drawing.

V-shaped triangular grooves 30$h$ extending in the left-right direction of FIG. 8B are formed on a lower surface of the cavity keeper body 30$d$. One pair of the triangular grooves 30$h$ are provided for each two locations that are a front side and a back side in the depth direction, of the drawing of FIG. 8B, of the cavity keeper 30. That is, the triangular grooves 30$h$ are provided at four locations. A distance between one pair of triangular grooves 30$h$ is set to correspond to a movement distance, of the cavity keeper 30, in the depth direction of the drawing, which will be described later. The cavity keeper 30 includes two positioning members 30$i$ spaced apart in the depth direction of the drawing. As shown in FIG. 8C, the positioning member 30$i$ generally has a cylindrical shape and includes a screw insertion hole 30$i_1$ on the upper side of the drawing. The positioning member 30$i$ also includes a triangular convex portion 30$i_2$ that has a substantially triangular cross section along a plane in the front-rear direction, extends in the left-right direction of the drawing of FIG. 8B, and protrudes upward. The positioning member 30$i$ includes a spring 30$i_3$ (see FIG. 8B) inside the positioning member 30$i$. The triangular convex portion 30$i_2$ is biased upward by the spring 30$i_3$ and protrudes upward from an elliptical window provided on an upper surface of the positioning member 30$i$. The triangular convex portion 30$i_2$ is buried in a housing of the positioning member 30$i$ in a case where a pressing force acts from above the positioning member 30$i$.

As shown in FIGS. 6 and 7, two cylindrical concave portions 31 corresponding to the positioning members 30$i$ are provided, in the front-rear direction, in the cavity keeper attachment concave portion 29. The positioning member 30$i$ is attached to the concave portion 31 via an attachment screw 30$j$. The cavity keeper body 30$d$ is arranged such that the triangular concave groove 30$h$ and the triangular convex portion 30$i_2$ correspond to each other. The respective left and right pressing plates 30$e$ are arranged along the upper ends of the widened portions 30$g$ on both sides, and are fastened to the cavity mold 16 by left and right three bolts 30$f$ via the through holes, which is not shown, of the pressing plates. In this way, the cavity keeper 30 is fixed to the cavity mold 16. The cavity keeper body 30$d$ is slidable and movable in the front-rear direction (in FIGS. 6 and 7, the front direction and the rear direction correspond to the downward direction and the upward direction of the drawing, respectively), inside the cavity keeper attachment concave portion 29. During the movement of the cavity keeper body 30$d$, the triangular convex portion 30$i_2$ of the positioning member 30$i$ is pushed down by a bottom surface of the cavity keeper body 30$d$. Accordingly, the movement of the cavity keeper body 30$d$ is not inhibited. As shown in FIG. 6, at a position where the cavity keeper body 30$d$ is most moved forward (hereinafter, referred to as a "forward movement limit (of the cavity keeper 30)"), the protruding triangular convex portion 30$i_2$ of the positioning member 30$i$ engages with a rear triangular groove 30$h$ of each pair of triangular grooves 30$h$. As shown in FIG. 7, at a position where the cavity keeper body 30$d$ is most moved backward (hereinafter, referred to as a "backward movement limit (of the cavity keeper 30)"), the protruding triangular convex portion 30$i_2$ of the positioning member 30$i$ engages with a front triangular groove 30$h$ of each pair of triangular grooves 30$h$. In this way, the cavity keeper body 30$d$ is positioned. The number and arrangement of the triangular grooves 30$h$ and the triangular convex portions 30$i_2$ for positioning are not limited to the example of the present embodiment, as long as the cavity keeper body 30$d$ is positioned at the forward movement limit and the backward movement limit. For example, two front and rear triangular convex portions 30$i_2$ may be provided in the positioning member 30$i$, and one triangular groove 30$h$ may be provided in a bottom surface of the cavity keeper body 30$d$.

An angular pin 34 protruding toward the primary core mold 10 while being inclined away from the X axis is provided behind the cavity keeper 30 of the cavity mold 16. The angular pin 34 is inserted into a rectangular block 35 having a pin holding hole 35$a$. In this state, the angular pin 34 is attached to the cavity mold 16 such that a tip of the angular pin 34 protrudes toward the primary core mold 10, by embedding the block 35 in the cavity mold 16. The block 35 is fixed to the cavity mold 16 by a known method (for example, bolts). Ahead portion 34$a$ of the angular pin 34 is enlarged in diameter with respect to the angular pin body 34$b$, and prevents the angular pin 24 from falling out of the pin holding hole 35$a$.

In the primary core mold 10, a cotter 32 having a mountain-shaped convex portion 32$b$ and a valley-shaped concave portion 32$c$ is attached to the position facing the cavity keeper 30. The convex portion 32$b$ and the concave portion 32$c$ configure an uneven structure of the cotter 32. The uneven structure of the cotter 32 complements the uneven structure of the cavity keeper 30. That is, the uneven structure of the cotter 32 can be combined with the uneven structure of the cavity keeper 30 in a state where the uneven structures face each other. Similarly to the cavity keeper 30, the cotter 32 also has a three-dimensional shape formed by moving the cross section shown in FIG. 6 in parallel. The primary core mold 10 is provided with a concave portion 33 that complements the three-dimensional shape of the cotter 32. Similarly to the block 35, the cotter 32 is fixed to the primary core mold 10 by a known method (for example, bolts) while being fitted in the concave portion 33.

A pin insertion portion 38 is provided behind the cotter 32 of the primary core mold 10. The pin insertion portion 38 has an opening having a width, in a direction orthogonal to the cross section, slightly greater than a diameter of the angular pin 34 and having a length, in the front-rear direction, to the extent that a passage of the angular pin 34 is secured. The pin insertion portion 38 is configured to receive the angular pin 34 that protrudes in accordance with the mold clamping. In the state where the primary core mold 10 and the cavity mold 16 are brought into contact with each other, (a tip of) the front end portion 30a of the cavity keeper 30 forms the first cavity C1 together with the primary core mold 10 and the cavity mold 16.

On the other hand, as shown in FIG. 7, in the secondary core mold 12, a slide portion 40 including a cotter portion 40d including a convex portion 40b having the same shape as the cotter 32 and a concave portion 40c, is attached to the position facing the cavity keeper 30. The slide portion 40 includes a pin insertion hole 40e that further extends rearward from the cotter portion 40d, and has a cylindrical shape having a diameter slightly greater than a diameter of the angular pin 34 at a position corresponding to the angular pin 34. The slide portion 40 is attached to the secondary core mold 12 to be slidable in the front-rear direction by a known method similar to that of an outer slide of an injection molding mold in the related art. A pin insertion portion 42 having the same shape as the pin insertion portion 38 is provided at a position corresponding to the pin insertion hole 40e of the secondary core mold 12.

(Details of Actions of Molded Product Holding Mechanism)

Figure 9:
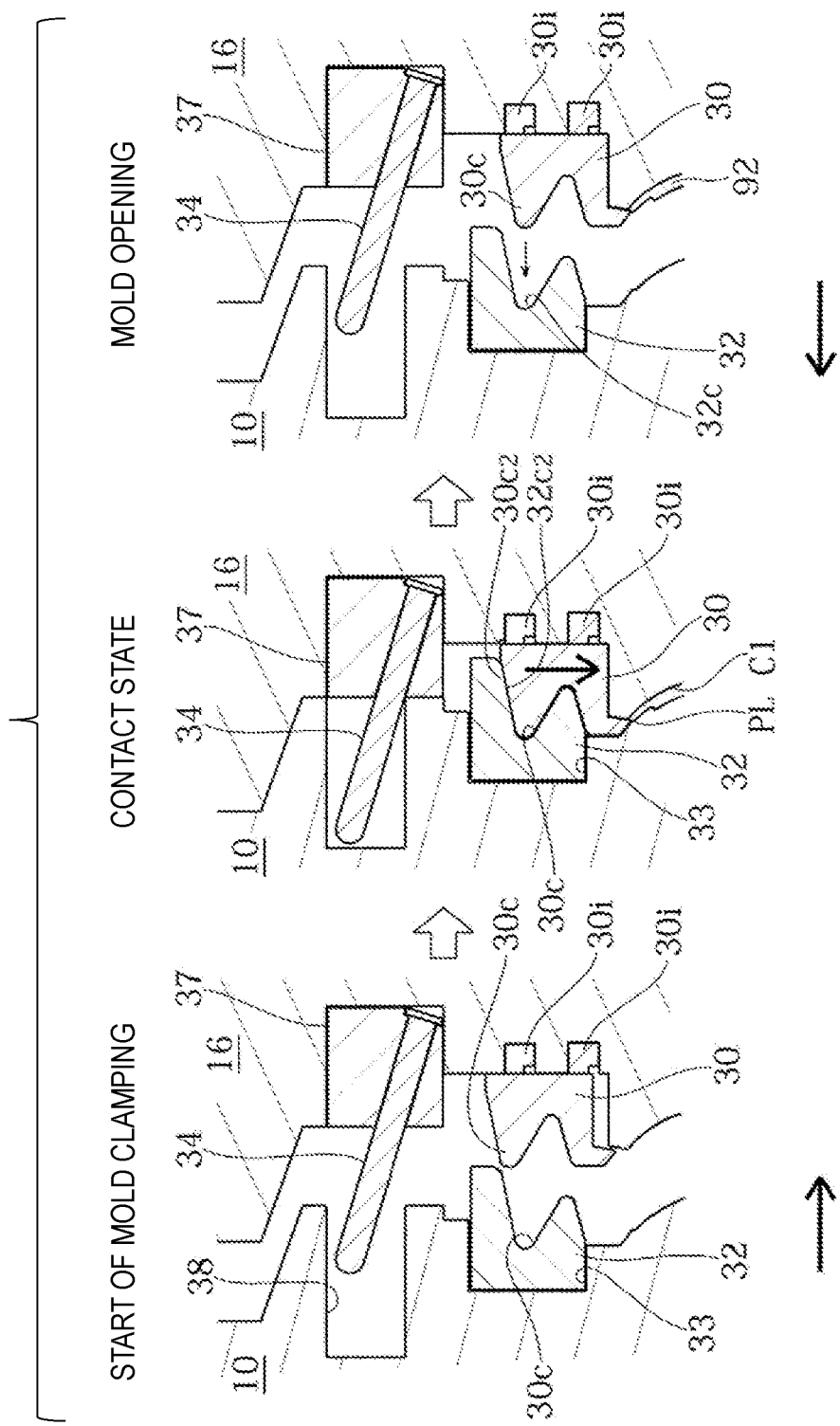
FIG. 9 is a diagram showing details of operations of the primary molded product holding portion at the time of primary molding in the injection molding method according to the present embodiment.

FIG. 9 is a drawing showing details of the actions of the molded product holding mechanism, that is, the cavity keeper 30, the cotter 32, and the angular pin 34 from the start of the mold clamping to the mold opening of the primary molding.

As shown in FIG. 9, in a case where the mold clamping is started, the cavity keeper 30 is at the backward movement limit, and the concave portion 30b and the convex portion 30c of the cavity keeper 30 and the convex portion 32b and the concave portion 32c of the cotter 32 deviate from each other by a predetermined distance in a direction orthogonal to the X axis.

Then, the angular pin 34 is inserted into the pin insertion portion 38 in accordance with the mold clamping operation.

Figure 10A:
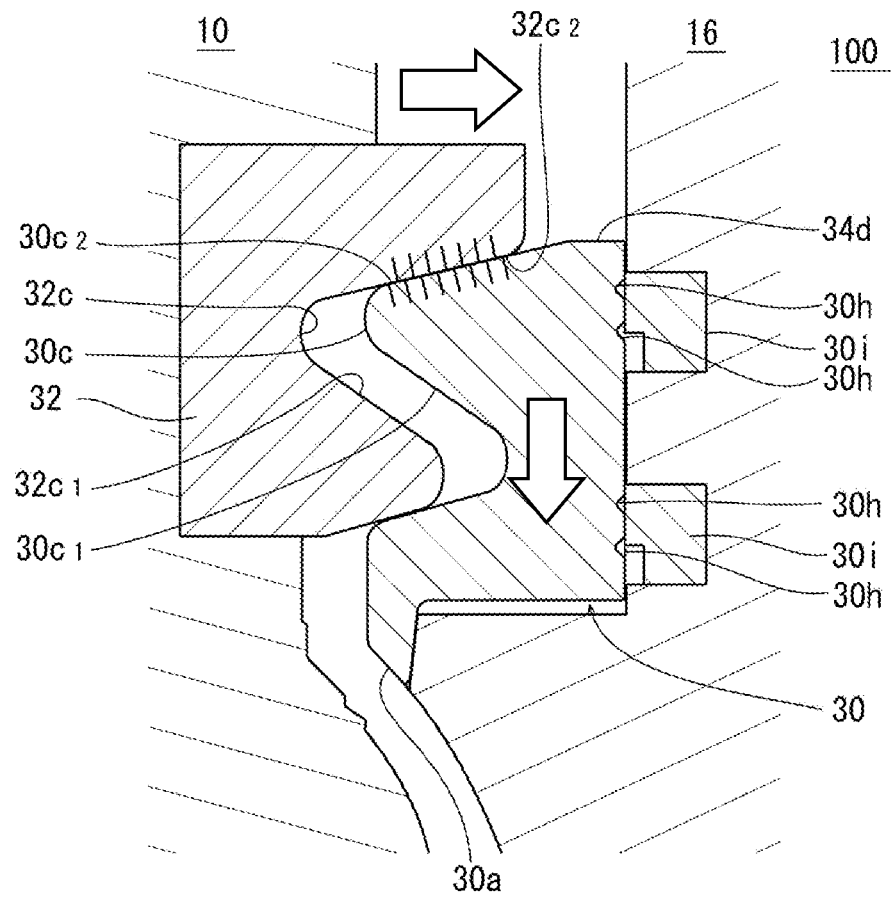
FIG. 10A is a diagram showing the operations of the primary molded product holding portion at the time of primary molding in the injection molding method according to the present embodiment.

At this time, as shown in an enlarged view in FIG. 10A, in a case where a rear side inclined face $32c_2$ of the concave portion 32c of the cotter 32 attempts to move forward in an arrow direction parallel to the X axis (the left-right direction in the drawing), the rear side inclined face $32c_2$ of the concave portion 32c of the cotter 32 comes into contact with a rear side inclined face $30c_2$ of the convex portion 30c of the cavity keeper 30. As a result, the rear side inclined face $32c_2$ pushes the cavity keeper 30 forward (downward in the drawing), and the cavity keeper body 30d is guided by the pressing plate 30e and moves forward.

In a case where the rear triangular groove 30h in each pair of triangular grooves 30h moves to the forward movement limit where the rear triangular groove 30h fits the triangular convex portion $30i_2$ of the positioning member 30i, the primary core mold 10 and the cavity mold 16 are brought into contact with each other. Then, the uneven structure (the concave portion 30b and the convex portion 30c) of the cavity keeper 30 is combined with the uneven structure (the convex portion 32b and the concave portion 32c) of the cotter 32 to stop the forward movement of the cavity keeper 30. At this time, the tip of the front end portion 30a of the cavity keeper 30 protrudes slightly into the first cavity C1 to define a part of the first cavity C1. In this way, the front end portion 30a of the cavity keeper 30 and the secondary core mold 12 form a parting line PL (see the contact state in FIG. 9). After that, the first resin material R1 is injected from the first heating cylinder 22 to mold the primary molded product 92.

Next, at the time of mold opening, in a case where the primary core mold 10 moves in a direction away from the cavity mold 16, the pin insertion portion 38 moves in a direction away from the angular pin 34 to pull the angular pin 34 out of the pin insertion portion 38. Although the cotter 32 is also separated from the cavity keeper 30 in the same way, there is no interaction such as at the time of mold clamping, and the front end portion 30a of the cavity keeper 30 is held in a state of being at the forward movement limit.

Figure 10B:
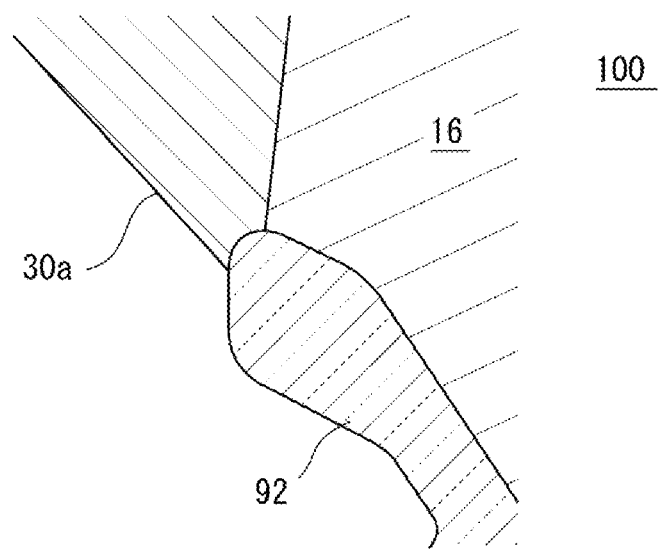
FIG. 10B is a diagram showing the operations of the primary molded product holding portion at the time of primary molding in the injection molding method according to the present embodiment.

At this time, as shown in an enlarged view in FIG. 10B, the tip of the front end portion 30a of the cavity keeper 30 engages with a part of the end surface of the peripheral edge of the primary molded product 92. During the mold opening and subsequent rotation of the rotation member 14, the tip of the front end portion 30a holds the primary molded product 92 in the cavity mold 16 and prevents the primary molded product 92 from being detached from the cavity mold 16.

(Actions of Molded Product Holding Portion at the Time of Secondary Molding)

Figure 11:
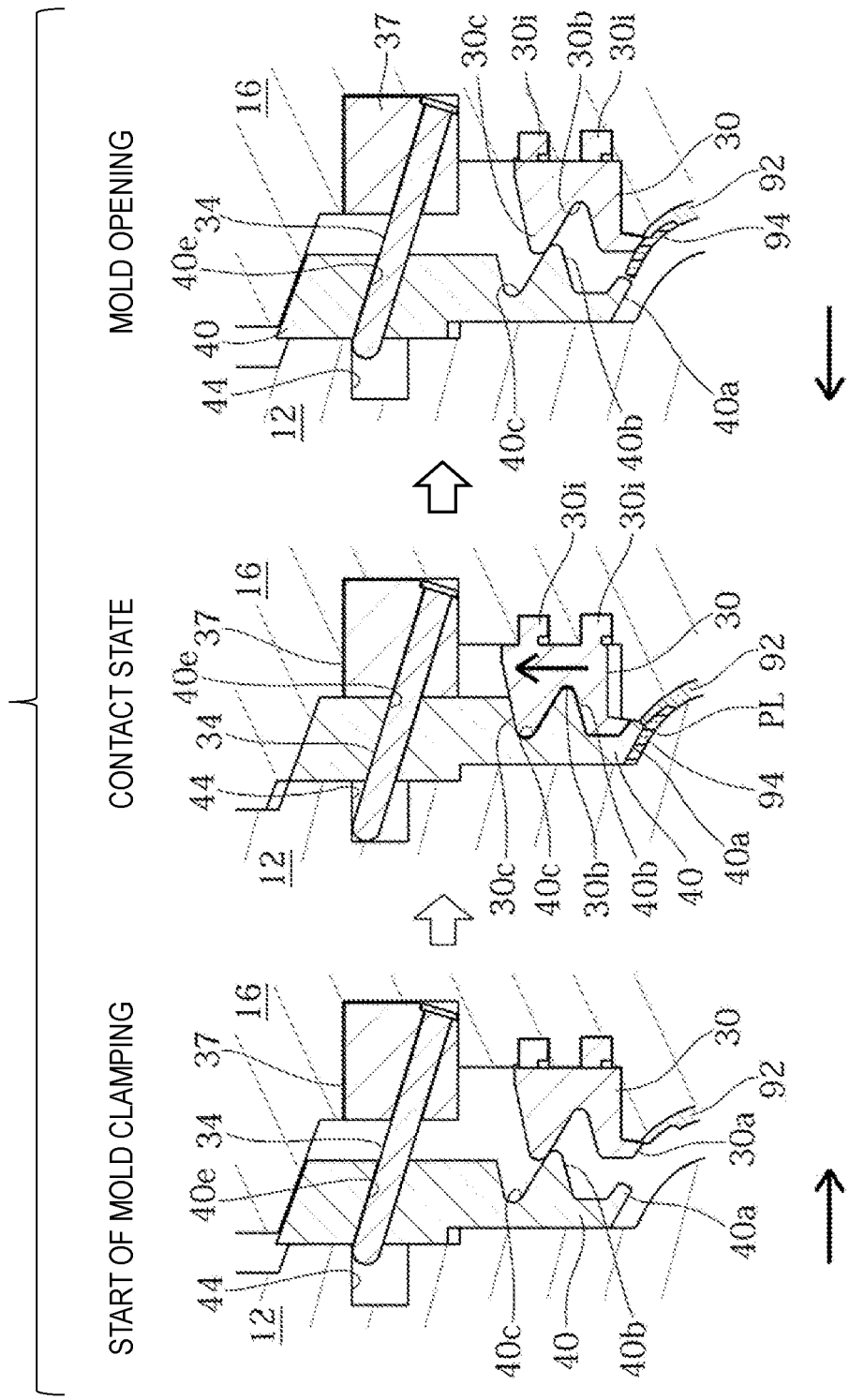
FIG. 11 is a diagram showing operations of the primary molded product holding portion at the time of secondary molding in the injection molding method according to the present embodiment.
Figure 12A:
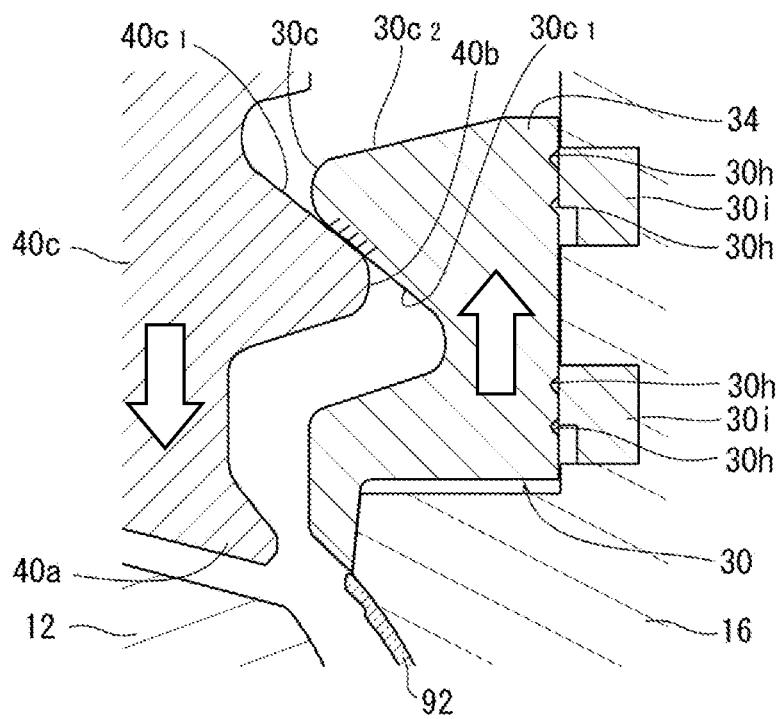
FIG. 12A is a diagram showing the operations of the primary molded product holding portion at the time of secondary molding in the injection molding method according to the present embodiment.
Figure 12B:
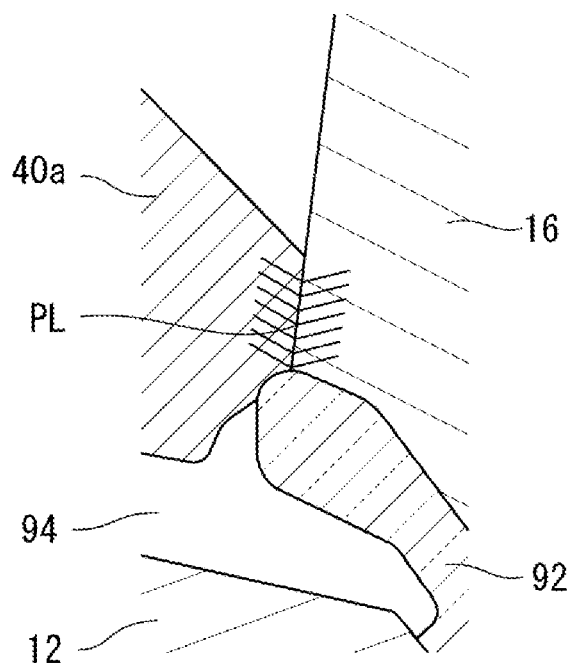
FIG. 12B is a diagram showing the operations of the primary molded product holding portion at the time of secondary molding in the injection molding method according to the present embodiment.

FIGS. 11, 12A, and 12B are drawings showing details of actions of the molded product holding mechanism, that is, the cavity keeper 30, the slide portion 40, and the angular pin 34 from the start of the mold clamping to the mold opening of the secondary molding.

As shown in FIG. 11, in a case where the mold clamping is started, the cavity keeper 30 is shifted forward with respect to the positioning member 30i fixed to the cavity mold 16 (the cavity keeper body 30d is at the forward movement limit). Then, as the angular pin 34 moves forward inside the pin insertion hole 40e in accordance with the mold clamping operation, the slide portion 40 starts moving forward. At the same time, as shown in FIG. 12A, in a case where a rear inclined face $40c_1$ of the concave portion 40c of the cotter portion 40d and a front inclined face $30c_1$ of the convex portion 30c of the cavity keeper 30 are brought into contact with each other, the rear inclined face $40c_1$ and the front inclined face $30c_1$ act on each other, and the cavity keeper 30 moves backward with respect to the cavity mold 16.

In a case where the front triangular groove 30h in each pair of triangular grooves 30h moves to the backward movement limit where the front triangular groove 30h fits the triangular convex portion $30i_2$ of the positioning member 30i, the secondary core mold 12 and the cavity mold 16 are brought into contact with each other. As shown in an enlarged view in FIG. 12B, the front end portion 30a of the cavity keeper 30 moves backward from the second cavity C2 and stops. Then, a tip portion 40a of the slide portion 40 defines a formation space of the secondary molded product 94 together with the primary molded product 92 and the secondary core mold 12, and a contact surface between the tip portion 40a of the slide portion 40 and the cavity mold 16 forms the parting line PL.

Next, the secondary core mold 12 moves away from the cavity mold 16 in accordance with the mold opening operation, and the angular pin 34 is released from the pin insertion hole 40e. Accordingly, the slide portion 40 moves backward. At the same time, the fitting between the cotter portion 40d and the concave portion and the convex portion of the cavity keeper 30 is released, and the slide portion 40 is separated from the cavity keeper, but there is no interaction at the time of mold clamping, and the cavity keeper body 30d is held in a state of being at the backward movement limit.

As described above, the mold device 100 includes the cavity keeper 30 capable of projecting into and retracting from the first cavity C1 and the slide portion 40 capable of projecting into and retracting from the second cavity C2. At the time of mold clamping in the primary molding, on the parting line PL, the tip of the front end portion 30a of the cavity keeper 30 protrudes into the first cavity C1, which is the molding space, to define the first cavity C1. At the time of mold opening in the primary molding, the front end portion 30a locks the primary molded product 92 on the end surface of the peripheral edge, and thus the primary molded product 92 can be held in the cavity mold 16. At the time of mold clamping in the secondary molding, the cavity keeper 30 and the slide portion 40 are caused to slide against each other to move the cavity keeper 30 backward from the molding space and move the slide portion 40 forward, and the second cavity C2 is defined by the tip of the slide portion 40, the secondary core mold 12, and the cavity mold 16.

According to the configuration described above, the cavity keeper 30 locks the primary molded product 92 on the parting line PL, that is, the end surface of the peripheral edge, to hold the primary molded product 92 in the cavity mold 16. Therefore, in the two-color molded product 90, traces of the cavity keeper 30 are not conspicuous, and the appearance of the two-color molded product 90 is improved. Here, the cavity keeper 30 does not necessarily have to be locked in the entire region in a thickness direction of the end surface, and as illustrated in the enlarged view in FIG. 10B, the cavity keeper 30 may be locked at a part of the end surface in the thickness direction. This is because if the amount of locking is small, the traces of the cavity keeper remaining in the two-color molded product 90 also become small, and become less conspicuous.

In addition, it is not necessary to provide a rib or a flange in the related art and which is provided only for holding the primary molded product into the cavity mold 16 after the primary molding, and in this regard, the appearance of the two-color molded product 90 is improved. Furthermore, since it is possible to achieve both the cavity keeper 30 that holds the primary molded product 92 on the parting line PL and the outer slide of the secondary core mold 12, it is possible to take in a configuration requiring an undercut in the secondary molded product 94. Accordingly, it is possible to cope with various designs, and design property of the two-color molded product 90 is improved.

In particular, in the present embodiment, the cavity keeper 30 and the slide portion 40 are provided with uneven structures having complementary shapes. The respective uneven structures includes the cotter 32 including the concave portion 30b and the convex portion 30c of the cavity keeper 30, and the cotter portion 40d including the convex portion 40b and the concave portion 40c of the slide portion 40. The uneven structure of the cavity keeper 30 and the uneven structure of the slide portion 40 cooperate with each other in accordance with the mold clamping operation and the mold opening operation, so that the cavity keeper 30 can operate in the front-rear direction. The operation mechanism of the cavity keeper 30 is not limited to this. However, according to the configuration described above, there is no need to provide a drive mechanism for the cavity keeper 30 such as a motor or a hydraulic cylinder, so that the configuration of the mold device 100 can be simplified and the manufacturing cost can be reduced.

In addition, in the present embodiment, the uneven structure of the cavity keeper 30 complements the uneven structure of the cotter 32. The cotter 32 is a structure that is originally necessary to prevent displacement between a fixed mold and a movable mold in the mold device 100, and is not required to be newly required for introduction of the cavity keeper 30. In this regard, excessive complication of the mold device 100 is also prevented.

Furthermore, in the present embodiment, the cavity mold 16 is provided with the angular pin 34 which is inclined with respect to the movement direction of the movable mold. The slide portion 40 can operate in the front-rear direction in accordance with the mold clamping operation and the mold opening operation, by a slide mechanism of the angular pin 34 and the slide portion 40. According to the configuration described above, the slide portion 40 is operated in conjunction with the mold clamping operation and the mold opening operation, and the cavity keeper 30 can be retracted from the second cavity C2 in conjunction with the operation of the slide portion 40. Therefore, it is not necessary to separately provide a drive mechanism for operating the slide portion 40 and the cavity keeper 30, the configuration of the mold device 100 can be simplified, and the manufacturing cost can be reduced.

In the embodiment described above, the cotter 32 and the angular pin 34 are respectively configured as members separate from the primary core mold 10 and the cavity mold 16, and are respectively fixed to the primary core mold 10 and the cavity mold 16. However, these respective members that do not move in accordance with the mold clamping operation and the mold opening operation may be formed integrally with the primary core mold 10 and the cavity mold 16.

Modification

As described above, the mold device 100 drives the cavity keeper 30 by the interaction between the cotter 32 and the cavity keeper 30 in the primary molding, and drives the slide portion 40 by the angular pin 34 and drives the cavity keeper 30 by the interaction between the slide portion 40 and the cavity keeper 30 in the secondary molding. However, in the present disclosure, the cavity keeper 30 and the slide portion 40 may be driven by a separately controlled drive mechanism.

Figure 13:
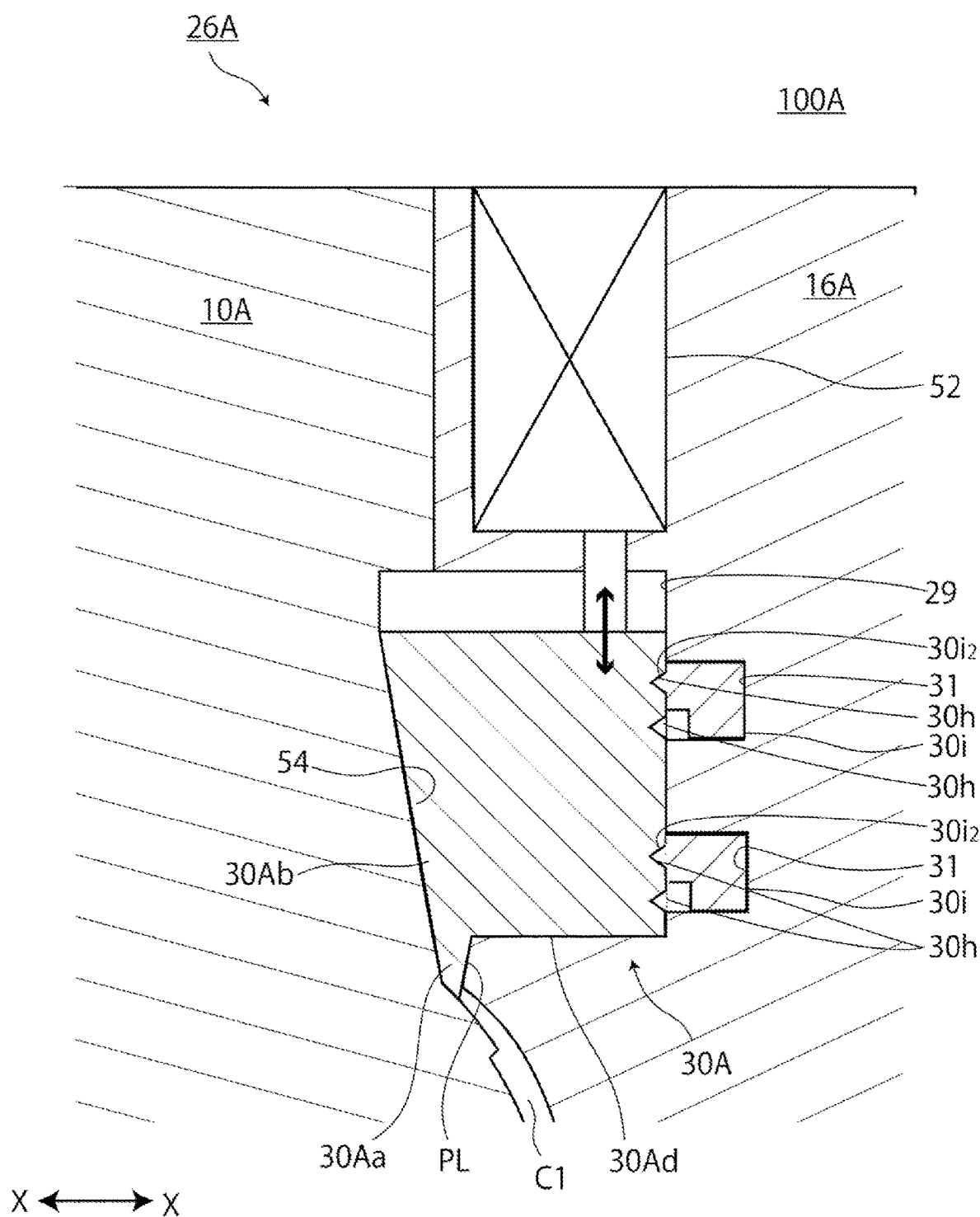
FIG. 13 is an enlarged view of a molded product holding mechanism in a contact state of a primary mold of a mold device according to a modification of the present embodiment.
Figure 14:
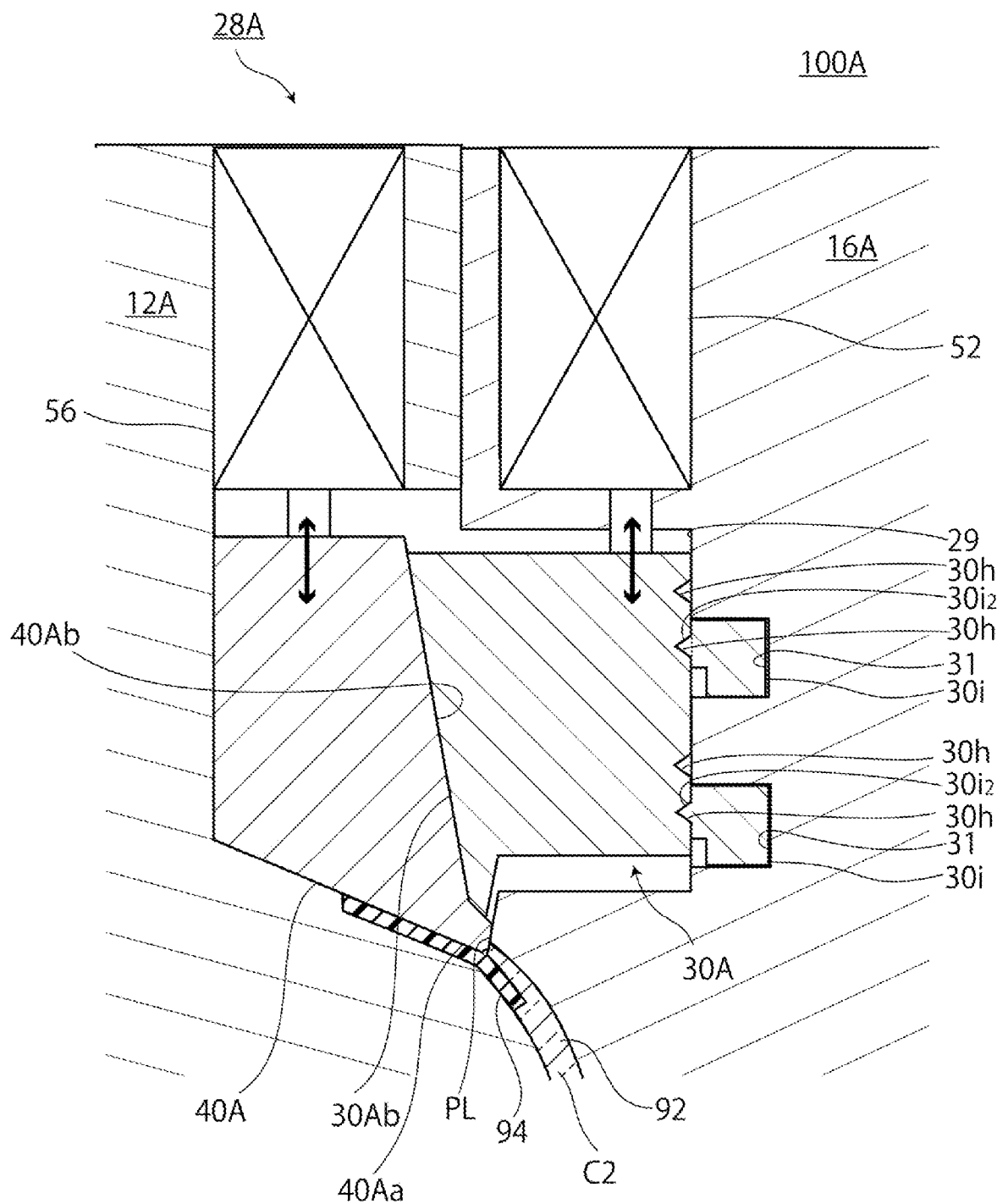
FIG. 14 is an enlarged view of the molded product holding mechanism in the contact state of a secondary mold of the mold device according to the present modification.

FIG. 13 is an enlarged view of a molded product holding mechanism in a contact state of a primary mold corresponding to FIG. 6 of a mold device 100A according to one of such modifications. FIG. 14 is an enlarged view of the molded product holding mechanism in the contact state of a secondary mold corresponding to FIG. 7 of the modification.

A primary mold 26A of the mold device 100A includes a primary core mold 10A and a cavity mold 16A. The cavity mold 16A includes a cavity keeper 30A as a primary molded product holding portion. The cavity keeper 30A includes the positioning member 30i having the same configuration as the cavity keeper 30. Meanwhile, unlike the cavity keeper 30, the cavity keeper 30A includes a cavity keeper body 30Ad having a substantially trapezoidal cross-sectional shape having an inclined surface 30Ab inclined forward toward the first cavity C1. The cavity keeper 30A includes a front end portion 30Aa having a thin beak-shape whose thickness is reduced forward.

In a contact state shown in FIG. 13, a front end portion 30Aa of the cavity keeper 30A protrudes, on the parting line PL, to define the end surface of the peripheral edge of the first cavity C1 corresponding to the primary molded product 92.

The cavity keeper 30A can move in the front-rear direction orthogonal to the X axis with respect to the cavity mold 16, by a mechanism similar to that of the cavity keeper 30.

Unlike the cavity mold 16, the cavity mold 16A does not include the angular pin 34 but includes a hydraulic cylinder 52 connected to the cavity keeper 30A outside the cavity keeper 30A. The hydraulic cylinder 52 enables the cavity keeper 30A to move in the front-rear direction indicated by a double-headed arrow under control of a controller that is not shown.

The primary core mold 10A does not need to include a cotter at a position facing the cavity keeper 30A. An inclined surface 54 that matches the inclined surface 30Ab of the cavity keeper 30A in a complementary manner is formed in the contact state, at the position facing the cavity keeper 30A of the primary core mold 10A. Then, in the contact state of the primary mold, the cavity keeper 30A is arranged at the forward movement limit. The primary core mold 10A does not need to include the pin insertion portion 38 functioning as the first pin insertion hole.

As illustrated in FIG. 14, the secondary mold of the mold device 100A includes a secondary core mold 12A and the cavity mold 16A. The secondary core mold 12A includes a slide portion 40A that is slidable in the front-rear direction orthogonal to the X-axis direction, instead of the slide portion 40. The slide portion 40A does not include the cotter portion 40d. The slide portion 40A includes an inclined surface 40Ab that matches the inclined surface 30Ab of the cavity keeper 30A in a complementary manner. The slide portion 40A has a three-dimensional shape having a substantially trapezoidal cross section. The tip portion 40Aa of the slide portion 40A protrudes into the second cavity C2 to define the second cavity C2 together with the primary molded product 92 and the secondary core mold 12A.

The secondary core mold 12A does not include the pin insertion portion 42 and the pin insertion hole 40e as the second pin insertion hole. However, the secondary core mold 12A includes a hydraulic cylinder 56 connected to the slide portion 40A at the rear of the slide portion 40A. The hydraulic cylinder 56 enable the slide portion 40A to move in the front-rear direction orthogonal to the X axis direction, regardless of the angular pin 34.

In the contact state of the secondary mold 28A, the cavity keeper 30A is positioned at the backward movement limit where the front end portion 30Aa is retracted from the molding space.

Then, at the time of mold clamping in the primary molding, in accordance with the mold clamping operation, the mold device 100A controls the hydraulic cylinder 52 to cause the cavity keeper 30A to move forward to the forward movement limit to protrude into the first cavity C1 on the parting line PL. Next, the mold device 100A injects the first resin material R1 into the first cavity C1 to mold the primary molded product 92. Then, the mold device 100A performs the mold opening in a state in which the front end portion 30Aa of the cavity keeper 30A is locked to the end surface of the peripheral edge of the primary molded product 92, and rotates the rotation member 14 by 180°.

Next, in accordance with the mold clamping operation in the secondary molding, the mold device 100A controls the hydraulic cylinder 52 to move the cavity keeper 30A backward from the forward movement limit and controls the hydraulic cylinder 56 to move the slide portion 40A forward at the same time. The cavity keeper 30A and the slide portion 40A can slide relative to each other between the backward movement of the cavity keeper 30A and the forward movement of the slide portion 40A by the inclined surfaces 30Ab and 40Ab, and can smoothly move. As a result, the tip portion 40Aa protrudes into the second cavity C2 to define the second cavity C2. Next, the mold device 100A injects the second resin material R2 into a portion of the second cavity C2 excluding the primary molded product 92 to mold the secondary molded product 94. After that, the mold device 100A performs the mold opening and takes out the two-color molded product 90 formed.

As described above, even in the case of using a drive mechanism that separately controls the cavity keeper 30A and the slide portion 40A, which are the molded product holding mechanism, the cavity keeper 30A of the primary core mold 10A and the slide portion 40A of the secondary core mold 12A have shapes that match each other in a complementary manner in a contact state. At the time of mold clamping in the primary molding, the cavity keeper 30A protrudes into the molding space (first cavity C1), and at the time of mold opening, the front end portion 30Aa of the cavity keeper 30A locks the end surface of the peripheral edge of the primary molded product 92. Similar to the mold device 100, the mold device 100A can hold the primary molded product 92 in the cavity mold 16A after the primary molding. Further, at the time of mold clamping in the secondary molding, the mold device 100A can simultaneously perform the backward movement of the cavity keeper 30A and the forward movement of the slide portion 40A by the complementary shapes of the cavity keeper 30A and the slide portion 40A, so that it is possible to achieve both of the cavity keeper 30A and the outer slide.

The drive mechanism for driving the cavity keeper 30A and the slide portion 40A is not limited to a hydraulic cylinder. For example, a motor may be used as the drive mechanism.

Although the preferred embodiments of the present disclosure have been described above, the embodiments described above are examples of the present disclosure, and the present disclosure is not limited thereto.

The present application appropriately incorporates contents disclosed in Japanese Patent Application No. 2020-210763 filed on Dec. 18, 2020.

The invention claimed is:

1. A mold device comprising:
a primary mold including a cavity mold and a primary core mold, the primary mold being configured to inject a first resin material into a first cavity to mold a primary molded product, the first cavity being formed by clamping the cavity mold and the primary core mold; and
a secondary mold including the cavity mold and a secondary core mold, the secondary mold being configured to inject a second resin material into a second cavity to stack mold a secondary molded product on a peripheral edge of the primary molded product, the second cavity being formed by clamping the cavity mold and the secondary core mold, the cavity mold being configured to hold the primary molded product, wherein the cavity mold includes a primary molded product holding portion configured to project into and retract from the first cavity, on a parting line of the primary mold, the secondary core mold includes a slide portion configured to project into and retract from the second cavity on a parting line of the secondary mold, the slide portion having a shape that complements the primary molded product holding portion, at the time of mold opening in primary molding, the primary molded product holding portion protruding into the first cavity locks an end surface of the primary molded product to hold the primary molded product in the cavity mold, and at the time of mold clamping in secondary molding, the primary molded product holding portion retracts from the second cavity and the slide portion slides relative to the primary molded product holding portion to protrude into the second cavity, to define the second cavity.

2. The mold device according to claim 1,
wherein, at the time of mold opening in the primary molding, a tip of the primary molded product holding portion protrudes into the first cavity to lock a part of an end portion of the primary molded product, to hold the primary molded product in the cavity mold.

3. The mold device according to claim 1,
wherein the primary core mold includes a cotter having an uneven structure along an outer periphery of the first cavity, the primary molded product holding portion includes an uneven structure that complements the cotter at the time of mold clamping in the primary molding, the slide portion includes a cotter portion having an uneven structure that complements the primary molded product holding portion, the primary molded product holding portion is configured to move forward toward the first cavity and protrude into the first cavity, as the uneven structure of the cotter and the uneven structure of the primary molded product holding portion cooperate with each other in accordance with a mold clamping operation of the primary mold, the slide portion is configured to move forward toward the second cavity in accordance with a mold clamping operation of the secondary mold, and the primary molded product holding portion is configured to retract from the second cavity, as the uneven structure of the cotter portion and the uneven structure of the primary molded product holding portion cooperate with each other in accordance with the mold clamping operation of the secondary mold.

4. The mold device according to claim 1,
wherein the cavity mold includes an angular pin provided to be inclined with respect to a movement direction of the primary core mold and the secondary core mold, the primary core mold is provided with a first pin insertion hole into which the angular pin is inserted, the slide portion is provided with a second pin insertion hole into which the angular pin is inserted, and the slide portion is configured to move forward toward the second cavity, as the angular pin is inserted into the second pin insertion hole in accordance with the mold clamping operation of the secondary mold.

5. An injection molding method of a two-color molded product in which a secondary molded product is stack molded on a peripheral edge of a primary molded product, the injection molding method comprising:

clamping a cavity mold and a primary core mold to define a first cavity, in which a primary molded product holding portion protrudes, the primary molded product holding portion being provided in the cavity mold, the primary molded product holding portion being configured to project into and retract from the first cavity on a parting line;

injecting a first resin material into the first cavity to mold the primary molded product;

opening the primary mold while the primary molded product holding portion locks an end portion of a peripheral edge of the primary molded product to hold the primary molded product in the cavity mold;

clamping a secondary core mold and the cavity mold to define a second cavity, in which the primary molded product holding portion retracts from the second cavity and the slide portion slides relative to the primary molded product holding portion to protrude into the second cavity to define the second cavity, the cavity mold holding the primary molded product, the primary molded product holding portion being configured to project into and retract from the second cavity on a parting line of a secondary mold, a slide portion having a shape that complements the primary molded product holding portion; and injecting a second resin material into a portion, of the second cavity, excluding the primary molded product to mold the secondary molded product.

\* \* \* \* \*